(No Model.)

G. J. CAVE.
BAKING PAN.

No. 593,390. Patented Nov. 9, 1897.

WITNESSES:
W. E. Ganahant
C. B. Kilney

George J. Cave, INVENTOR
BY Drake & Co
ATTORNEYS

UNITED STATES PATENT OFFICE.

GEORGE J. CAVE, OF ELIZABETH, NEW JERSEY.

BAKING-PAN.

SPECIFICATION forming part of Letters Patent No. 593,390, dated November 9, 1897.

Application filed February 18, 1897. Serial No. 624,006. (No model.)

*To all whom it may concern:*

Be it known that I, GEORGE J. CAVE, a citizen of the United States, residing at Elizabeth, in the county of Union and State of New Jersey, have invented certain new and useful Improvements in Baking-Pans; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The objects of this invention are to secure a more even and uniform baking of the loaf, to reduce the evaporation of the said loaf during the baking process, whereby the said loaf when baked will be more moist and palatable and will so remain a greater period, to obtain a more even brownness throughout the outside surface of the loaf without forming at any one part a hard and brittle crust, to facilitate the operation of baking, and to secure other advantages and results, some of which may be referred to hereinafter in connection with the description of the working parts.

The invention consists in the improved baking-pan and in the arrangements and combinations of parts thereof, all substantially as will be hereinafter set forth, and finally embraced in the clauses of the claim.

Figure 1:
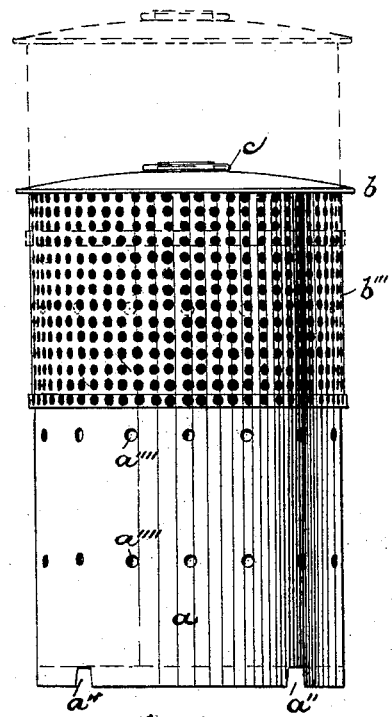
Figure 2:
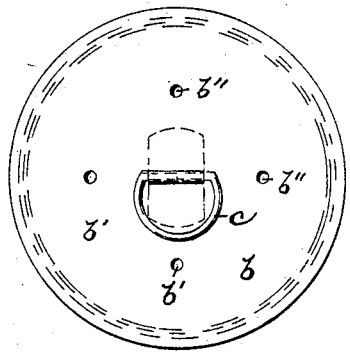
Figure 3:
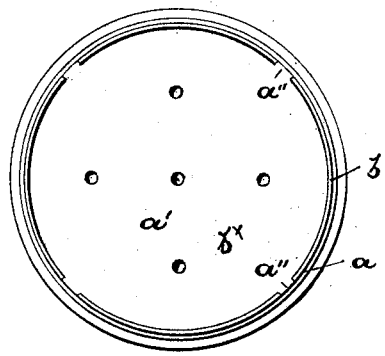

Referring to the accompanying drawings, in which like letters of reference indicate corresponding parts in each of the several figures, Figure 1 is a side elevation of the improved baking-pan. Figure 2 is a plan of the same, and Fig. 3 is a reversed plan showing the bottom of the pan.

In said drawings, $a$ indicates the body of the baking-pan, which is vertically disposed and preferably cylindrical, though it may be of any cross-sectional shape. This body is formed of sheet metal and has a bottom $a'$ raised a little above the lower edges of the vertical walls of the body, so as to form a depending flange upon which the pan may rest and prevent the bottom from touching the stove. The said flange is notched or open at $a''$, so as to allow the circulation of air beneath the bottom of the pan. The said bottom may be and preferably is perforated to allow a limited escape of moisture or other gaseous products due to the baking process at the bottom of the loaf. The straight vertical sides of the body portions are also perforated, the perforations being quite frequent, as indicated in Fig. 1, also to allow evaporation from the loaf.

Above the pan at its open mouth is arranged a telescopic cover $b$, consisting of a top piece $b'$, which is preferably perforated, as at $b''$, and a profusely-perforated depending flange $b'''$, which closely fits the outer sides of the body, so as to slide thereon, a frictional contact of said flange and body being provided sufficiently to enable the cover to maintain its position upon said body in accordance with any desirable adjustment of the baker. The flange, being also vertically disposed, is free to slide on the vertical body without any lateral movement and consequent catching should the upper pressure of the bread be one-sided. The flange extends a considerable distance down the sides of the body and thus cannot be detached when the bread rises and will not thus allow an overrunning of the bread from the pan. The cover is provided with a suitable handle $c$ to facilitate the operation of lowering and raising the cover. The perforated flange of the cover is of considerable depth, so as to allow a full scope in the adjustment thereof. Said flange is made, preferably, of the perforated sheet metal commonly employed in the production of strainers.

The ventilating-perforations $a''''$ in the body of the pan are useful also in admitting a broom-whisk or such like implement for testing the consistency of the loaf as to whether it is sufficiently baked or not.

In using the invention thus described the baker partially fills the body of the pan with dough to, say, one-half its depth. Before placing in the oven the dough is given an opportunity to rise to near the top of the pan, after which it is placed in the oven for baking, in which operation it rises considerably above the top edge of the body and engages the profusely-perforated flange and continues its rising to its full extent. The flanged cover prevents an overbaking of the dough, so that the surface of the loaf remains soft and both palatable and digestible. The flange of the cover also serves to hold the loaf in proper form, preventing said dough from overrunning the sides of the pan and giving a misshapen upper end. It also prevents wastage. The telescopic part not only admits of an adjustment by the hand to suit the rising dough, but it may also be automatically movable, so that should the dough rise into contact with the under side of the top of the cover the said cover may be forced up by the said rising dough without detriment to the loaf.

Having thus described the invention, what I claim as new is—

The improved baking-pan herein described, comprising a body, vertically disposed, and a cover therefor, said cover being provided with a deep depending flange, freely perforated and having a form in cross-section corresponding to that of the body, the cover being adapted to slide telescopically on the body, thereby permitting the free rising of the loaf during the baking operation and holding the loaf in uniform shape from end to end, substantially as set forth.

In testimony that I claim the foregoing I have hereunto set my hand this 15th day of February, 1897.

GEORGE J. CAVE.

Witnesses:
CHARLES H. PELL,
C. B. PITNEY.